United States Patent [19]
Machi et al.

[11] Patent Number: 5,108,565
[45] Date of Patent: Apr. 28, 1992

[54] METHOD FOR REMOVING HARMFUL GAS FROM REFUSE COMBUSTION EXHAUST GAS

[75] Inventors: Sueo Machi; Shoichi Sato; Okihiro Tokunaga; Yasushi Aoki, all of Takasaki; Shouichi Suda, Tokyo; Tsuneharu Miyachi, Tokyo; Yokichi Shibamura, Tokyo; Keita Kawamura, Fujisawa; Ryoji Suzuki; Toru Agarida, both of Tokyo, all of Japan

[73] Assignees: Japan Atomic Energy Research Institute; NKK Corporation; Ebara Corporation, all of Tokyo, Japan

[21] Appl. No.: 577,455

[22] Filed: Sep. 4, 1990

[30] Foreign Application Priority Data

Sep. 6, 1989 [JP] Japan .................. 1-230649

[51] Int. Cl.⁵ .............................................. B01D 53/00
[52] U.S. Cl. ................... 204/157.3; 204/157.46; 204/157.49; 204/158.2
[58] Field of Search ............. 204/157.3, 158.2, 157.46, 204/157.49

[56] References Cited

U.S. PATENT DOCUMENTS

| 4,524,142 | 6/1985 | Hsu et al. ........................ 502/153 |
| 4,732,832 | 2/1983 | Bush ............................. 204/157.44 |
| 4,953,356 | 7/1990 | Dietrich ........................ 204/157.44 |
| 5,015,443 | 5/1991 | Ito et al. ....................... 204/157.3 |

FOREIGN PATENT DOCUMENTS

| 0026187 | 3/1988 | European Pat. Off. ......... 204/157.3 |
| 48-17471 | 3/1973 | Japan . |
| 5040462 | 8/1973 | Japan . |
| 87274302 | 8/1987 | Japan ........................... 204/157.3 |
| 2165827 | 2/1985 | United Kingdom ............. 204/157.3 |

OTHER PUBLICATIONS

Chemical Engineering Progress, vol. 81, No. 10, Oct. 1985, New York, U.S., pp. 33-38; R. J. Gleason et al.; "High-Efficiency $NO_x$ and $SO_x$ Removal by Electron Beam".

Primary Examiner—John Niebling
Assistant Examiner—Steven P. Marquis
Attorney, Agent, or Firm—Frishauf, Holtz, Goodman & Woodward

[57] ABSTRACT

A method of removing harmful gas from a refuse combustion exhaust gas. The refuse combustion exhaust gas, containing a harmful gas such as hydrogen chloride, is supplied to a reactor. Other steps include atomizing an alkaline material within the reactor, and applying radiation, such as an electron beam, to the refuse combustion exhaust gas, simultaneously with the atomizing of the alkaline material, thereby causing a reaction between the gas and the alkaline material, and recovering a salt produced by the reaction.

3 Claims, 4 Drawing Sheets

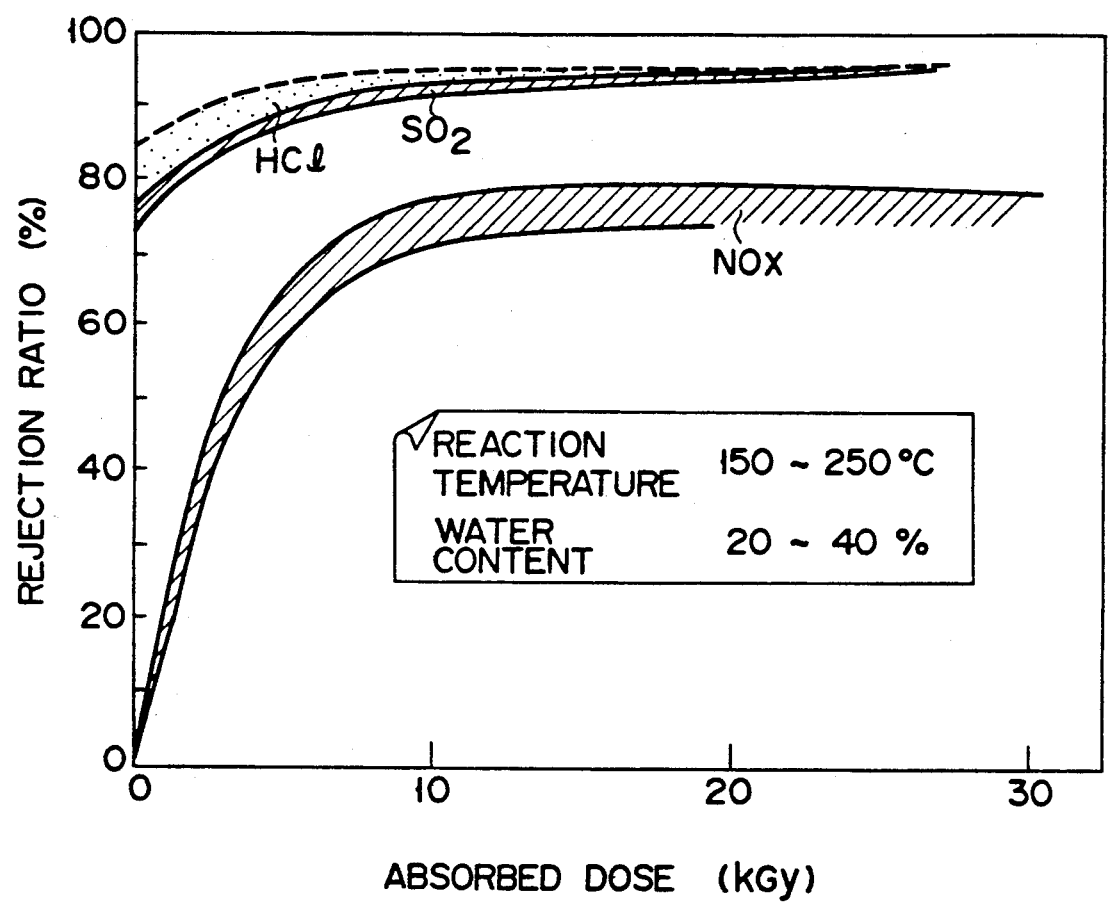
F I G. 2

METHOD FOR REMOVING HARMFUL GAS FROM REFUSE COMBUSTION EXHAUST GAS

BACKGROUND OF THE INVENTION

1. Field of the Invention

The present invention relates to a method of removing harmful gas from a refuse combustion exhaust gas.

2. Description of the Related Art

A refuse combustion exhaust gas contains harmful gases of nitrogen oxides, sulfur oxides, hydrogen chlorides, and organo-chloric compounds such as dioxine group and the like—all generated from nitrogen, sulfur and chlorine which exist in the refuse. The contents of the first three of these harmful substances are regulated by the law. More specifically, the content of nitrogen oxides should be 80 to 200 ppm or less; that of sulfur oxides should be 30 to 120 ppm or less; and that of hydrogen chlorides should be 300 to 1200 ppm or less. In order to prevent secondary pollution which may occur due to these oxides existing in air, thereby to protect the health of people and preserve their environment, the harmful gases must be removed more efficiently from the refuse combustion exhaust gas. The standards of disposing refuse have actually been made more severe, and gas-removing processes, more complex than the conventional ones, are applied in practice.

Further, although the organo-chloric compound of dioxine is not regulated in our country at present in Japan, for example, the harmfulness thereof becomes a serious issue. However, the real condition is that no counterplan is carried out to cope with such issue.

There are two methods generally employed of removing nitrogen oxides, sulfur oxides, and hydrogen oxides (not organo-chloric compounds such as dioxine and the like). The first is a wet process, and the second is a semi-dry process.

FIG. 3 shows the wet process.

(1) The high temperature exhaust gas having temperature of 750° to 950° C. generated from an incinerator is cooled down to 250° to 350° C. in a boiler 2.

(2) Dust in the exhaust gas is removed in a dust collector 3.

(3) $NH_3$ gas is blown and the resulting gas is led into a catalyst tower 4 for reducing nitrogen oxides, and the nitrogen oxides are removed by reducing in accordance with a reaction formula represented by following.

$$4NO + 4NH_3 + O_2 \rightarrow 4N_2 + 6H_2O$$

(4) The exhaust gas is washed in a tower 5 for removing hydrogen chloride and sulfur oxides using a large amount of water. At this time, in order to maintain a neutral washing, an alkaline material represented by a sodium hydroxide is added. The resulting reaction at this time is as follows.

$$HCl + NaOH \rightarrow NaC + H_2O$$

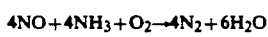

$$SO_2 + 2NaOH + 1/2O_2 \rightarrow Na_2SO_4 + H_2O$$

Salt produced by the above mentioned formulas is extracted with one portion of the washing and are disposed by processes such as coagulating sedimentation, filtration, a biological process and so on after dilution with fresh water.

(5) Since the washed gas from which the harmful contents are removed has a temperature lower than 100° C., the gas is heated to 120° to 180° C. by a reheater 6 and is diffused to the air from a funnel 7 in order to a) prevent a dew point corrosion of duct and funnel, b) prevent water from dropping from top portion of funnel, c) improve a diffusion efficiency, and d) prevent occurrence of steam white smoke from the funnel, and so on.

FIG. 4 shows the semi-dry process.

(1) The high temperature exhaust gas having temperature of 750° to 950° C. generated from the incinerator 1 is cooled down to 250° to 350° C. in the boiler 2.

(2) $Ca(OH)_2$ slurry is blown from the top portion of a tower 8 for removing hydrogen chloride and sulfur oxides as the alkaline material, wherein such slurry is atomized finely to diffuse within the tower, thereby removing hydrogen chloride and sulfur oxides by neutralizing in accordance with reaction formulas represented by the following.

$$2HCl + 2Ca(OH_2) \rightarrow CaCl_2 \cdot Ca(OH)_2 \cdot H_2O + H_2O$$
$$SO_2 + Ca(OH)_2 + 1/2O_2 \rightarrow CaSO_4 + 2H_2O$$

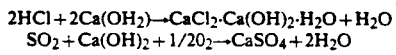

(3) Salt which is a solid state product produced by the above mentioned formulas is removed and recovered by the dust collector 3.

(4) $NH_3$ gas is blown, and the resulting gas is led into the catalyst tower 4 for reducing nitrogen oxides to reduce and remove the nitrogen oxides in accordance with the following formula.

$$4NO + 4NH_3 + O_2 \rightarrow 4H_2 + 6H_2O$$

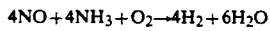

(5) The disposed gas is diffused to the air through the funnel 7.

Apart from the exhaust gas from the incinerator, a method is shown in Japan Laid-Open Patent No. 17471173 for activating by irradiating an activating rays against the harmful gas of sulfur dioxide and nitrogen oxides and so on in the combustion exhaust gas from a thermal power plant in which a fuel oil and coal are used as fuel, to realize decomposition or to render the gas harmless.

U.S. Pat. No, 4,372,832 shows a method for disposing exhaust gas in case of where a fuel including a large amount of sulfur is used. According to this method, the exhaust gas is washed by a spray drying method and the temperature of the resulting gas is lowered to increase hydroscopic moisture thereof. Then, the resulting exhaust gas is disposed with an electron beam radial rays.

U.S. Pat. No. 4,524,142 also shows the method for disposing exhaust gas in case of where the fuel including a large amount of sulfur is used. According to this method, first lime stone is supplied into the boiler. Then, the exhaust gas from the boiler is humidified and the temperature thereof is lowered at the same time. The resulting gas is disposed with the electron beam radial rays.

There are common problems in the wet process as shown in FIG. 3 and the semi-dry process as shown in FIG. 4 as followings.

(1) Since the gas temperature has to be heated to more than about 250° C. in order to prevent bindings between catalyst layers in the catalyst tower 4 for reducing the nitrogen oxides, a boiler recovery heat quantity has to be restricted. The blindings are caused by producing an acid ammonium sulfate (NH$_4$HSO$_4$), which leads to an unstable operation.

(2) Since the catalyst to be used is very expensive and it has to change or reproduce periodically, the maintenance becomes a very complicated one.

(3) In order to have the structure for preventing blindings, the volume for the device of catalyst layer becomes large.

(4) Since the gas temperature is high about (250° C.), the volume for the device of the dust collector 3 becomes large.

(5) The excess NH$_3$ and ammonium chloride generated by hydrogen chloride are often noted as white smoke, thereby causing complaints from the residents who live in and around the incinerator.

(6) It needs to deal with NH$_3$ which is a poisonous substance.

Further, as regards the problem inherent in the wet process as shown in FIG. 3, there are problems as follows.

(7) A large amount of water of 0.7 m$^3$ per 1 t of refuse is needed as a makeup water for washing gas in the tower 5 for removing hydrogen chloride and sulfur oxides.

(8) Since the washing contains three to five times salting concentration as sea water, it is not possible to make a wastewater treatment directly. Therefore, about 0.6 m$^3$ dilution water is needed every 1 t of refuse.

(9) A complicated equipment for wastewater treatment is needed.

(10) In the reheater 6 for solving the above mentioned problems caused by the fact that the gas temperature after washing is low, a large amount of heat quantity (about 250,000 Kcal per 1 t of refuse) is needed.

Japanese Laid-Open Patent Publication No. 17471/73 discloses the invention to remove the harmful gas contents in the combustion gas of fuel oil and cool and so on, for example, sulfur dioxide and nitrogen oxides, and it is questionable whether the above invention function effectively against the refuse combustion exhaust gas including large amount of hydrogen chloride as high as ten times the harmful gas disclosed therein.

SUMMARY OF THE INVENTION

The present invention is to solve the above problem, and the object of the present invention aims to provide an improved method for removing harmful gas in the refuse combustion exhaust gas, wherein it is possible to realize a space-saving for equipment, a reduction of required power, a simple operation controlling, and a prevention of occurrence of secondary environment pollution.

According to the method for removing harmful gas in the refuse combustion exhaust gas, after the refuse combustion exhaust gas including harmful gas such like hydrogen chloride is led to a reactor, an alkaline material is atomized within the reactor, and radiation such as an electron beam is applied at the same time, to recover a salt produced by reacting.

Further, a calcium hydroxide slurry is used as the alkaline material to activate the hydrogen chloride contained in the exhaust gas, oxidize the nitrogen oxides contained in the exhaust gas to nitric acid, and oxidize the sulfur oxides contained in the exhaust gas to sulfuric acid. The activated hydrogen chloride, the nitric acid, and the sulfuric acid are neutralized by the alkaline slurry at the same time to recover a salt produced by such neutralization.

After the refuse combustion exhaust gas including harmful gas is feed to the reactor, water or an alkaline slurry is introduced into the reactor to lower the temperature of exhaust gas to 150° to 300° C., preferably to 150° to 250° C., and radiation such as an electron beam is applied at the same time, so that the organo-chloric compound of dioxine in the exhaust gas is decomposed to render the harmful gas harmless.

According to a present method for removing harmful gas in the refuse combustion exhaust gas, it is possible to render the harmful gas contents harmless by the synchronous function in the single process with the following characteristic means.

(1) Function 1

If a calcium hydroxide slurry, which is as the alkaline material, is atomized against the hydrogen chloride and sulfur oxides and so on, which exist under an acid condition, among the harmful gas in the exhaust gas, the following neutralization reactions occur, thereby producing a solid state product.

Main reaction: $2HCl + 2Ca(OH)_2 \longrightarrow$

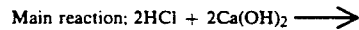
$CaCl_2 \cdot Ca(OH)_2 \cdot H_2O + H_2O$

Side reaction: $SO_2 + Ca(OH)_2 + 1/2O_2 \longrightarrow CaSO_4 + 2H_2O$

At the same time, by a radical as shown in the next Function 2, the above reaction is promoted in the complicated reaction path. Finally, a rejection ratio of HCl and SO$_2$ increases by irradiating the radial rays.

(2) Function 2

If the radial rays of electron beam and so on is irradiated to the peripheral portion where the above function 1 is achieved, Cl radical, 0 atom, OH radical, and HO$_2$ radical occur under a coexistence of water and oxygen in the exhaust gas, thereby causing the following oxidation, that is, unreacted hydrogen chloride, sulfur oxides, and nitrogen oxides are oxidized to chlorine monoxide, sulfuric acid, and nitric acid, respectively.

Reaction of hydrogen chloride;

$HCl \longrightarrow H + Cl$ $Cl + O_3 \longrightarrow ClO + O_2$ $Cl + O \longrightarrow ClO$ Reaction of sulfur oxides:

$SO_2 + O \longrightarrow SO_3 \xrightarrow{H_2O} H_2SO_4$ $SO_2 + OH \xrightarrow{O_2, H_2O} H_2SO_4$ $SO_2 + HO_2 \longrightarrow HSO_4 \xrightarrow{H_2O} H_2SO_4$ Reaction of nitrogen oxides;

$$NO + O \longrightarrow NO_2$$
$$NO + OH \longrightarrow HNO_2$$
$$NO + HO_2 \longrightarrow NO_2 + OH$$
$$2HNO_2 \longrightarrow NO + NO_2 + H_2O$$
$$NO_2 + OH \longrightarrow HNO_3$$

Function 3

At the same of proceeding the oxidation of the above Function 2, the following neutralization reaction occurs, thereby producing a salt which is a solid state product.

$$2ClO + 2Ca(OH)_2 \longrightarrow CaCl_2 \cdot Ca(OH)_2 \cdot H_2O + 3/2O_2$$

$$H_2SO_4 + Ca(OH)_2 \longrightarrow CaSO_4 + 2H_2O$$

$$2HNO_3 + + Ca(OH)_2 \longrightarrow Ca(NO_3)_2 + 2H_2O$$

By proceeding the above mentioned three kinds of functions simultaneously, the harmful gas contents are rendered to be harmless and the solid state product can be recovered.

Next, since it has been known that the organochloric compound of dioxine and so on in the exhaust gas is generated at relative high temperature (about more than 300° C.), the exhaust gas is led to the reactor and the water content or alkaline slurry is atomized against the exhaust gas to lower the temperature of gas by means of a latent heat of vaporization of water, thereby controlling the occurrence of a latent dioxine. At the same time, by irradiating the radial rays against the gas, a chemical active ingredient of OH, H, and so on is prepared. Such ingredient reacts with dioxine directly so that chlorine atom is apart from a benzene ring and the benzene ring is opened. As a result of that, it is possible to make the chain harmless stable material.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates a presently preferred embodiment of the invention and, together with the general description given above and the detailed description of the preferred embodiment given below, serves to explain the principles of the invention.

FIG. 2 is a diagram for showing the relationship between the absorbed dose and the rejection ratio of the harmful gas in the present invention.

DETAILED DESCRIPTION OF THE PREFERRED EMBODIMENT

Figure 1:
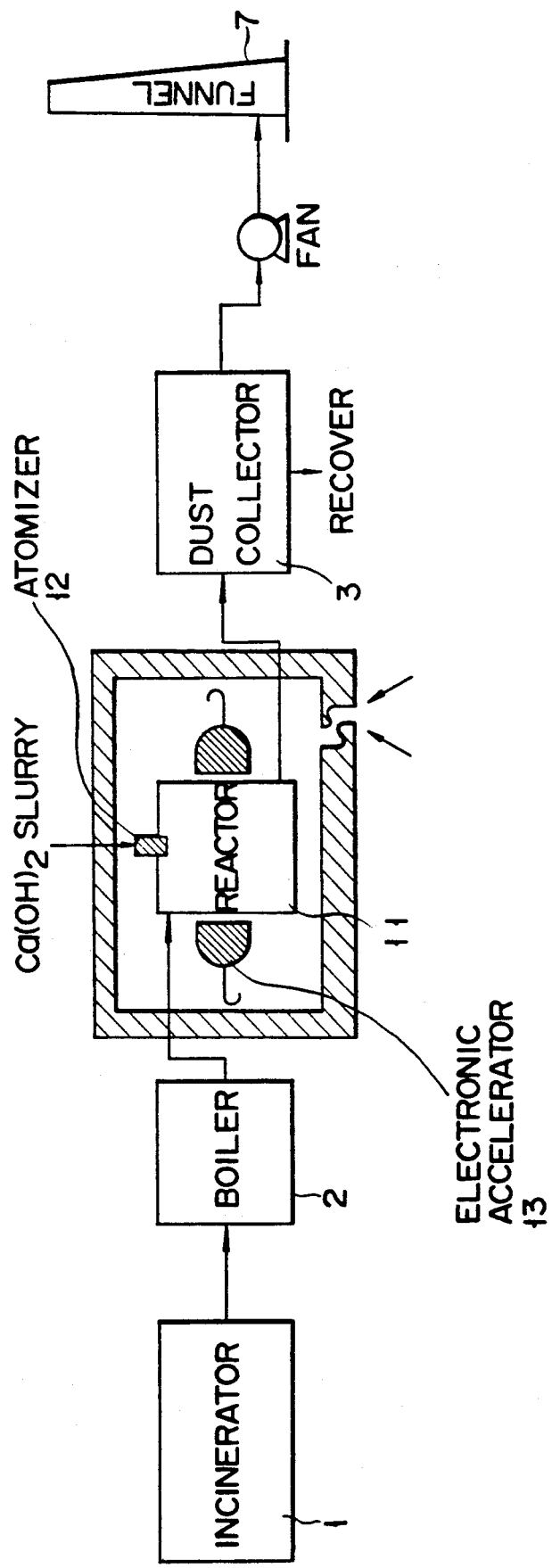
FIG. 1 is a flow chart including a device for realizing the method of the present invention.
Figure 3:
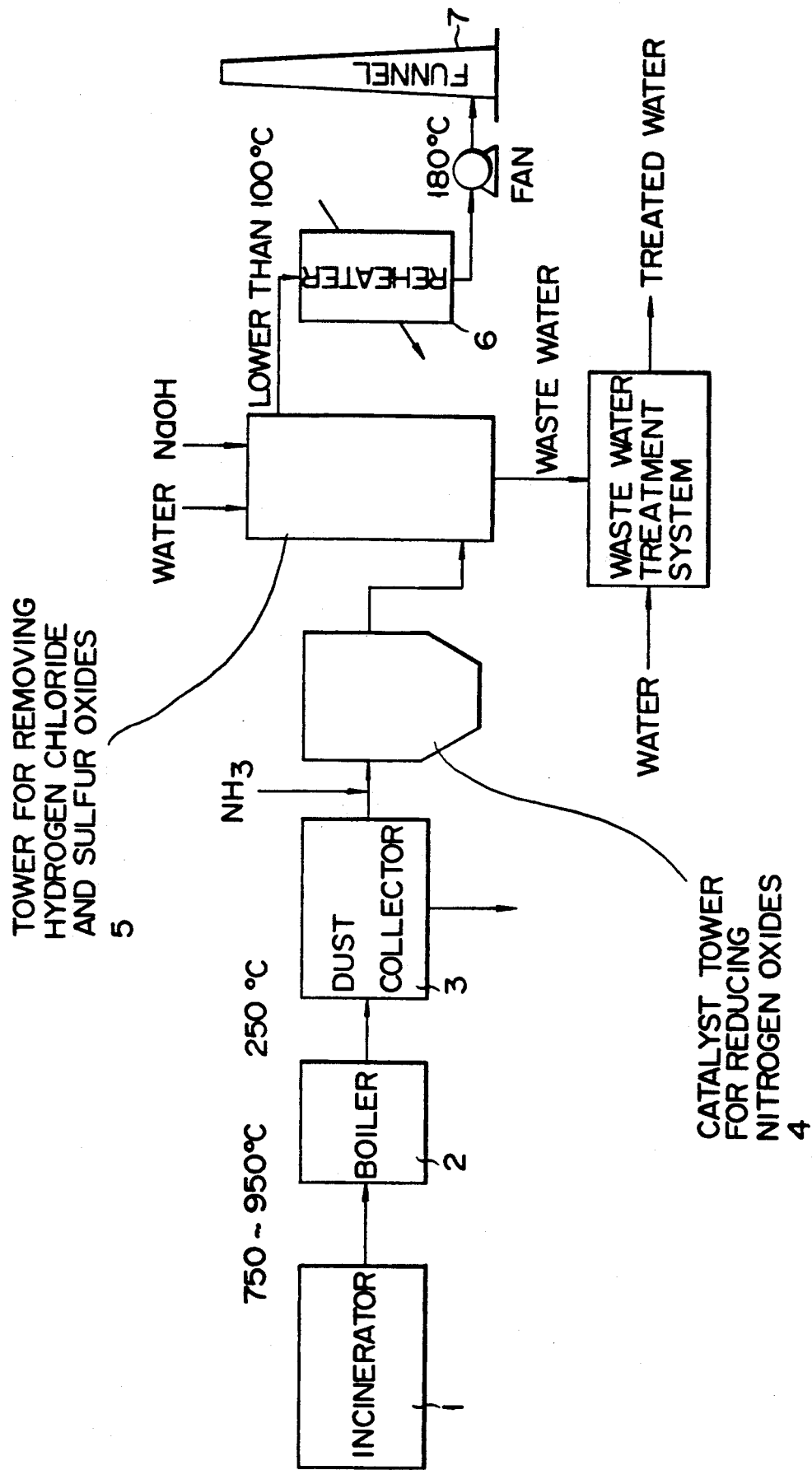
FIGS. 3 and 4 are flow charts for showing the different conventional methods for removing harmful gas in the refuse combustion exhaust gas.
Figure 4:
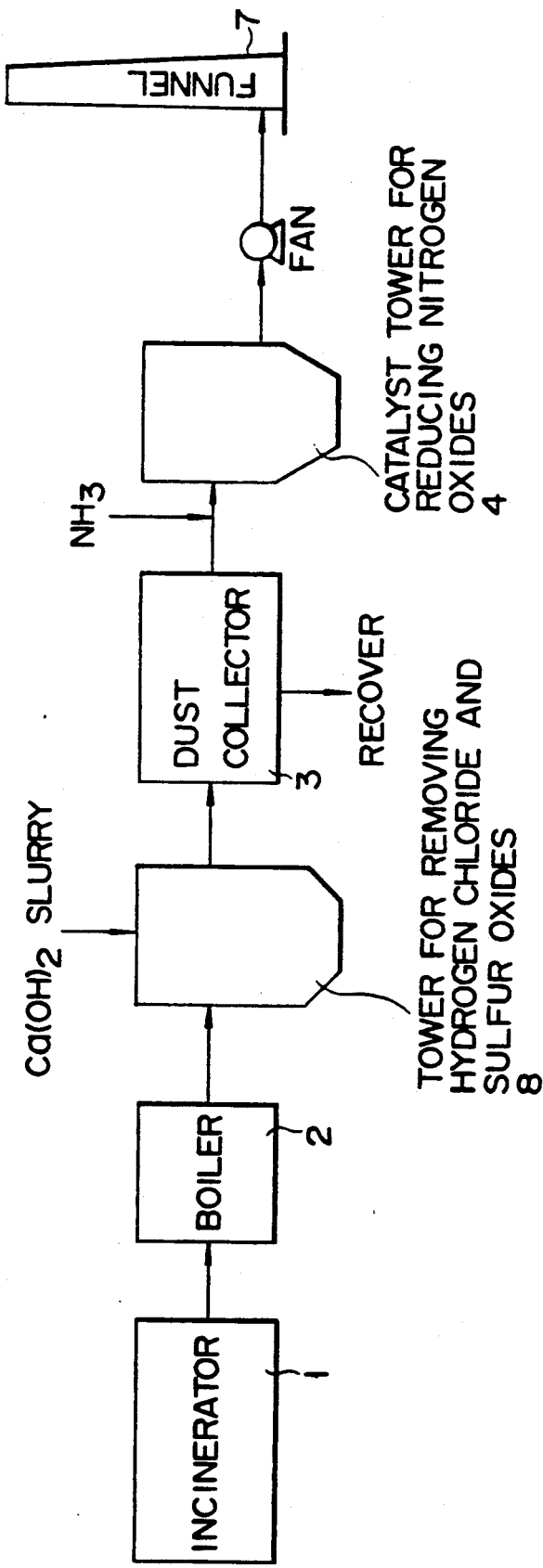

Hereinafter, the reference is made to one embodiment of the present invention using FIG. 1.

A synthesized simulation refuse combustion exhaust gas including about 100 ppm of NO concentration, about 100 ppm of $SO_2$ concentration, and about 1000 ppm of HCl concentration was heated to 150° to 300° C., more preferably to 150° to 250° C., and the resulting was led into the reactor 11 for removing harmful gas.

The reactor 11 for removing harmful gas contains a volume of about 80 1 and is constructed so that externally supplied $Ca(OH)_2$ can be atomized finely by an atomizer 12 as the alkaline material Further, the reactor 11 is arranged so that radiation such as an electron beam is applied from the side surface by, for example, an electronic accelerator 13.

One to 30 kGy of absorbed dose was applied by a Cockcroft-Walton electron beam accelerator 13, under ordinary conditions, that is, the gas quantity of 2.8 $Nm^3/Hr$ and the water content of 20 to 30% of alkali, or 1 to three times the stoichiometic amount required for neutralizing the acid.

At this time, although there is a large amount of hydrogen chloride within the reactor 11 for removing harmful gas, the above mentioned functions 1 to 3 proceed rapidly. The rejection ratio of harmful contents (concentration) in the gas measured in the after process of the dust collector 3 for recovering solid state salt reduced by the neutralization reaction is as shown in FIG. 2. Namely, the following effects can be expected.

Further, as a result of the test against the refuse combustion exhaust gas including dioxine and so o under the same device and conditions, there is no change of number of chlorine atom and transformation to an isomer and the harmful 2, 3, 7, 8-TCDDs decrease to realize harmlessness of gas.

As to a radial rays mentioned in the present invention, it indicates X-ray, electron beam, corpuscular beam, α-ray, β-ray, γ-ray, and ultraviolet rays and so on from a device for generating radial rays, a corpuscular accelerator, and a radioactive isotope, and the needed absorbed dose and other conditions are not restricted to that in the present invention.

[ADVANTAGE OF THE INVENTION]

As mentioned above, the present invention relates to a method for removing harmful gas in the refuse combustion exhaust gas, wherein the following advantages are realized.

(1) The rejection of ratio of the hydrogen chloride and sulfur oxides improves and the rejection of ratio of nitrogen oxides also improves in accordance with the increment of the absorbed dose, which are possible to cope with the change of regulation in the future.

(2) It is possible to remove the hydrogen chloride, sulfur oxides, and nitrogen oxides contained in the exhaust gas simultaneously by means of a single tower removing harmful gas and it is possible to render the organo-chloric compound harmless, thereby realizing i) space-saving, (ii) reduction of the needed power for a fan, and (iii) simple maintenance.

(3) The catalyst for reducing denitration is not needed.

(4) The gas temperature at an outlet of boiler can be controlled to about 200° C., thereby increasing boiler recovery heat quantity.

(5) It is possible to remove the all harmful gas contents with only $Ca(OH)_2$, which is very cheap, to be used.

(6) Since the gas temperature at an inlet of the dust collector is very low, it is possible to use a dust collector having small size and small volume.

(7) Since $NH_3$, which is a poisonous substance, is not needed, i) the blindings and corrosion due to acid ammonium sulfate do not occur, and ii) since ammonium chloride does not occur, there is no possibility of being noted as the white smoke.

(8) Since the water is used only for controlling calcium hydroxide slurry, the amount to be used can be significantly reduced.

(9) Since the reaction product is always exhausted in the form of solid state of dry salt, it is not needed to provide a gas washing equipment, a dilution water, and a complicated effluent treatment at all.

(10) Since the temperature of gas generated from the dust collector is about 120° C., the reheater 6 for solving problems caused by the low temperature of gas after washing is not needed, thereby reducing energy appreciably.

Additional advantages and modifications will readily occur to those skilled in the art. Therefore, the invention in its broader aspects is not limited to the specific details, and illustrated examples shown and described. Accordingly, various modifications may be made without departing from the spirit or scope of the general inventive concept as defined by the appended claims and their equivalents.

We claim:

1. A method of removing harmful gas from a refuse combustion exhaust gas, comprising the steps of:
   supplying the refuse combustion exhaust gas containing hydrogen chloride as a harmful gas into a reactor;
   atomizing an alkaline material within the reactor;
   applying an electron beam radiated from an electron accelerator to the refuse combustion exhaust gas, simultaneously with the atomizing of the alkaline material, thereby causing a reaction between said refuse combustion exhaust gas and said alkaline material; and
   recovering a salt produced by the reaction.

2. The method according to claim 1, wherein said alkaline material is a calcium hydroxide slurry used to activate the hydrogen chloride contained in the refuse combustion exhaust gas, oxidize the nitrogen oxides contained in the refuse combustion exhaust gas to nitric acid, and oxidize the sulfur oxides contained in the refuse combustion exhaust gas to sulfuric acid, and to neutralize the activated hydrogen chloride, the nitric acid and the sulfuric acid, thereby forming a salt.

3. A method of removing harmful gas from a refuse combustion exhaust gas, comprising the steps of:
   supplying the refuse combustion exhaust gas containing hydrogen chloride as a harmful gas into a reactor;
   spraying water or an alkaline slurry into the reactor, thereby decreasing the temperature within the reactor; and
   simultaneously with said spraying step, applying an electron beam radiated from an electron accelerator to the refuse combustion exhaust gas, thereby decomposing an organo-chloric compound contained in the refuse combustion exhaust gas and rendering the same harmless.

* * * * *

UNITED STATES PATENT AND TRADEMARK OFFICE
CERTIFICATE OF CORRECTION

PATENT NO. : 5,108,565
DATED : April 28, 1992
INVENTOR(S) : MACHI et al

It is certified that error appears in the above-identified patent and that said Letters Patent is hereby corrected as shown below:

Title page, Section [56] References Cited -

Replace U.S. Patent "4,732,832" with --4,372,832--.

Signed and Sealed this

Twenty-eighth Day of September, 1993

Attest:

BRUCE LEHMAN

Attesting Officer    Commissioner of Patents and Trademarks